United States Patent
Ishibashi

(10) Patent No.: US 10,116,093 B2
(45) Date of Patent: Oct. 30, 2018

(54) CONNECTOR DEVICE

(71) Applicant: Sumitomo Wiring Systems, Ltd., Yokkaichi-shi, Mie (JP)

(72) Inventor: Takeshi Ishibashi, Yokkaichi (JP)

(73) Assignee: Sumitomo Wiring Systems, Ltd., Yokkaichi-shi, Mie (JP)

( * ) Notice: Subject to any disclaimer, the term of this patent is extended or adjusted under 35 U.S.C. 154(b) by 0 days.

(21) Appl. No.: 15/545,734

(22) PCT Filed: Jan. 13, 2016

(86) PCT No.: PCT/JP2016/050763
§ 371 (c)(1),
(2) Date: Jul. 24, 2017

(87) PCT Pub. No.: WO2016/121494
PCT Pub. Date: Aug. 4, 2016

(65) Prior Publication Data
US 2018/0019544 A1    Jan. 18, 2018

(30) Foreign Application Priority Data
Jan. 28, 2015   (JP) ................................ 2015-014043

(51) Int. Cl.
*H01R 13/631* (2006.01)
*H02K 5/22* (2006.01)
(Continued)

(52) U.S. Cl.
CPC ......... *H01R 13/6315* (2013.01); *H01R 13/02* (2013.01); *H01R 13/5202* (2013.01);
(Continued)

(58) Field of Classification Search
CPC .... H01R 12/91; H01R 13/6315; H01R 13/74; H01R 13/748; H01R 13/5219; H01R 13/5202
(Continued)

(56) References Cited

U.S. PATENT DOCUMENTS 3,883,209 A * 5/1975 Kongelbeck ....... H01R 13/6315
439/248
4,697,859 A * 10/1987 Fisher, Jr. .......... H01R 13/6315
439/246
(Continued)

FOREIGN PATENT DOCUMENTS

| JP | 2010-225488 | 10/2010 |
| JP | 2011-187224 | 9/2011 |
| JP | 2013-140821 | 7/2013 |

OTHER PUBLICATIONS

International Search Report dated Apr. 5, 2016.
Japanese Office Action dated May 31, 2018.

*Primary Examiner* — Felix O Figueroa
(74) *Attorney, Agent, or Firm* — Gerald E. Hespos; Michael J. Porco; Matthew T. Hespos

(57) ABSTRACT

A connector device includes: a motor-side connector 30 including motor-side terminals 31; an inverter-side connector 60 including inverter-side terminals 70; a motor case 10 including the motor-side connector 30; and an inverter case 50 including the inverter-side connector 60. The connectors 30, 60 are fitted to each other when the inverter case 50 is stacked on and coupled with the motor case 10. The motor-side connector 30 is fixedly mounted in the motor case 10 via a mounting hole 11 of the motor case 10. The inverter-side connector 60 is supported on the inverter case 50 while penetrating through a mounting hole 79 of the inverter case 50 in a radially freely movable manner.

4 Claims, 13 Drawing Sheets

(51) Int. Cl.
*H02K 11/30* (2016.01)
*H01R 13/52* (2006.01)
*H01R 13/74* (2006.01)
*H01R 13/02* (2006.01)
*H02K 11/33* (2016.01)

(52) U.S. Cl.
CPC ....... *H01R 13/5219* (2013.01); *H01R 13/748* (2013.01); *H02K 5/22* (2013.01); *H02K 5/225* (2013.01); *H02K 11/30* (2016.01); *H02K 11/33* (2016.01); *Y02T 10/641* (2013.01)

(58) Field of Classification Search
USPC .......................................................... 439/248
See application file for complete search history.

(56) References Cited

U.S. PATENT DOCUMENTS

| | | | |
|---|---|---|---|
| 8,011,977 B2* | 9/2011 | Tsuruta | H01R 13/6215 439/752 |
| 8,585,421 B2* | 11/2013 | Yamaguchi | H01R 13/05 439/248 |
| 9,343,941 B2* | 5/2016 | Okamoto | H01R 13/5202 |
| 2012/0015546 A1 | 1/2012 | Yamaguchi et al. | |
| 2012/0319513 A1 | 12/2012 | Okamoto et al. | |

\* cited by examiner

CONNECTOR DEVICE

BACKGROUND

1. Field of the Invention

The present invention relates to a connector device used for electrically connecting a motor and an inverter.

2. Description of the Related Art

In electric vehicles and hybrid vehicles, when a motor and an inverter are electrically connected, motor terminals (connector) and inverter terminals (connector) are conventionally connected using a wire harness.

In recent years, a connector device has been proposed in which, for space saving purposes, for example, a motor-side connector including motor-side terminals in a motor case and an inverter-side connector including inverter-side terminals in an inverter case are disposed opposite each other, and the inverter case is directly connected to the motor case, thereby fitting the respective connectors to each other and connecting the respective terminals. An example of the connector device is disclosed in Japanese Patent Application Laid-Open No. 2010-225488.

In a structure for attaching a connector to a case, there maybe adopted a means for fixing the connector to the case using screws and the like, with the connector passed through a mounting hole opened in the case. In this case, when the mounting hole is formed, forming position variability may be produced due to processing accuracy, or connector attachment position variability may result from a positional displacement and the like of the connector in the mounting hole. In such cases, even if two cases are opposed to each other in normal posture, the respective connectors may not be opposed to each other normally. That is, a positional displacement may be caused, resulting in the connectors being fitted together in a skewed or forced manner, or, in extreme cases, a failure to be fitted together.

The present invention was made in view of the above circumstances, and an object of the present invention is to ensure normal fitting together of a motor-side connector and an inverter-side connector in an arrangement in which the connectors are fitted to each other as a result of cases being stacked one above the other and coupled with each other.

SUMMARY

According to the present invention, a connector device includes: a motor-side connector including a motor-side terminal; an inverter-side connector including an inverter-side terminal; a motor case including the motor-side connector; and an inverter case including the inverter-side connector. The motor-side connector and the inverter-side connector are fitted to each other when the inverter case is stacked on and coupled with the motor case. The motor-side connector is fixedly mounted in the motor case while penetrating through a mounting hole of the motor case. The inverter-side connector is supported on the inverter case while penetrating through a mounting hole of the inverter case in a radially freely movable manner.

The inverter-side connector is mounted in the inverter case in a floating state. Accordingly, when the inverter case is stacked on the motor case, even if the inverter-side connector and the motor-side connector are misaligned, the inverter-side connector can freely move radially, allowing the connectors to be aligned and the connectors to be normally fitted to each other. Because the inverter-side connector is disposed in a floating state, transmission of vibrations of one of the motor and the inverter to the other via the connectors can be interrupted and thus avoided.

The following configurations may be adopted.

(1) The inverter case may have a stepped hole for receiving a flange circumferentially provided on an outer surface of the inverter-side connector in a radially freely movable manner, and a lock plate having a lock hole opened therein so as to be lockable on a peripheral edge of the flange may be attached on a surface of the inverter case, and whereby the mounting hole supporting the inverter-side connector penetrating therethrough to be radially movable freely is formed.

The floating function of the inverter-side connector can be implemented by a simple structure.

(2) The motor-side terminal and the inverter-side terminal may be connectable to each other via a flexible conductive member.

The vibrations on one of the motor side and the inverter side are absorbed by the flexible conductive member, so that the transmission of the vibrations to the other via the connected terminals can be avoided.

(3) The inverter-side terminal may include a first connecting portion connected to the motor-side terminal, and a second connecting portion connected to an output of the inverter, the first connecting portion and the second connecting portion being connected by the flexible conductive member.

According to the present invention, when the motor-side connector and the inverter-side connector are fitted to each other as a result of their cases being stacked one above the other and coupled with each other, normal fitting together of the connectors can be ensured.

DETAILED DESCRIPTION

An embodiment of the present invention will be described with reference to FIG. 1 to FIG. 13.

Figure 5:
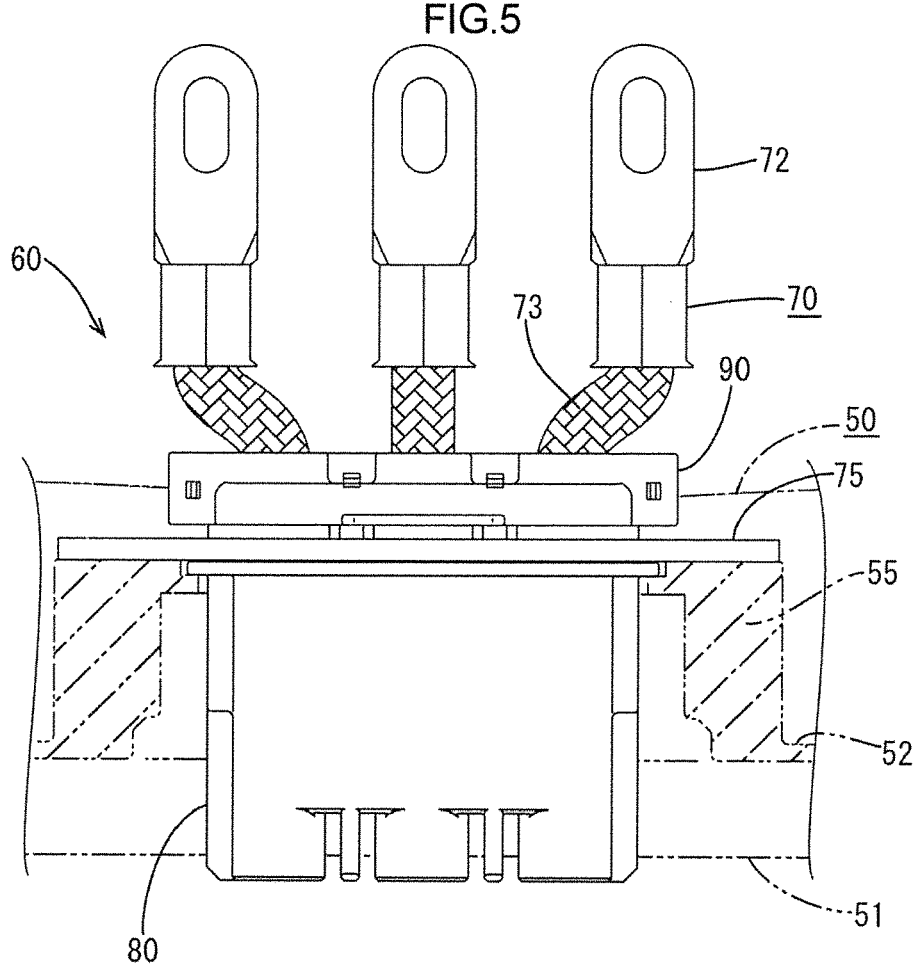
FIG. 5 is a front view of the motor-side connector and the inverter-side connector before being fitted together.
Figure 5:
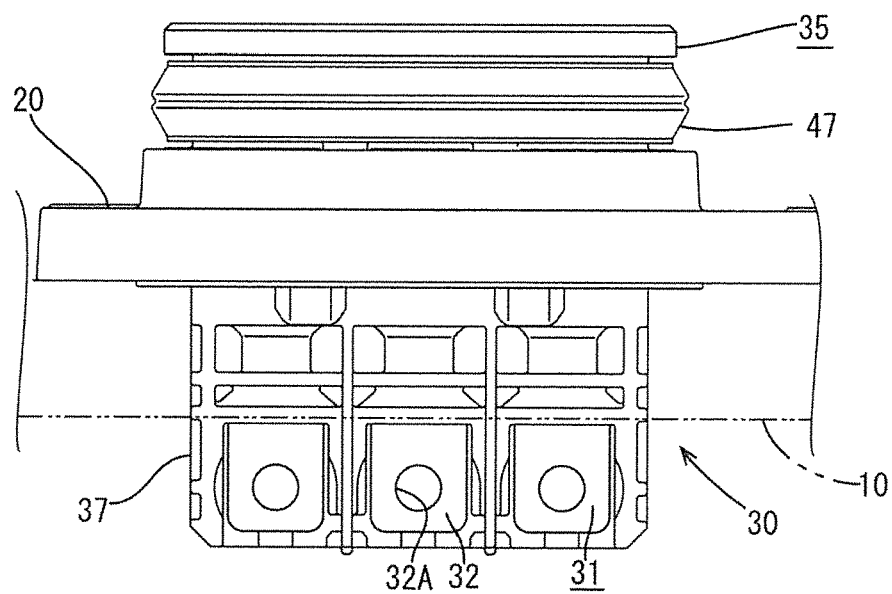
Figure 6:
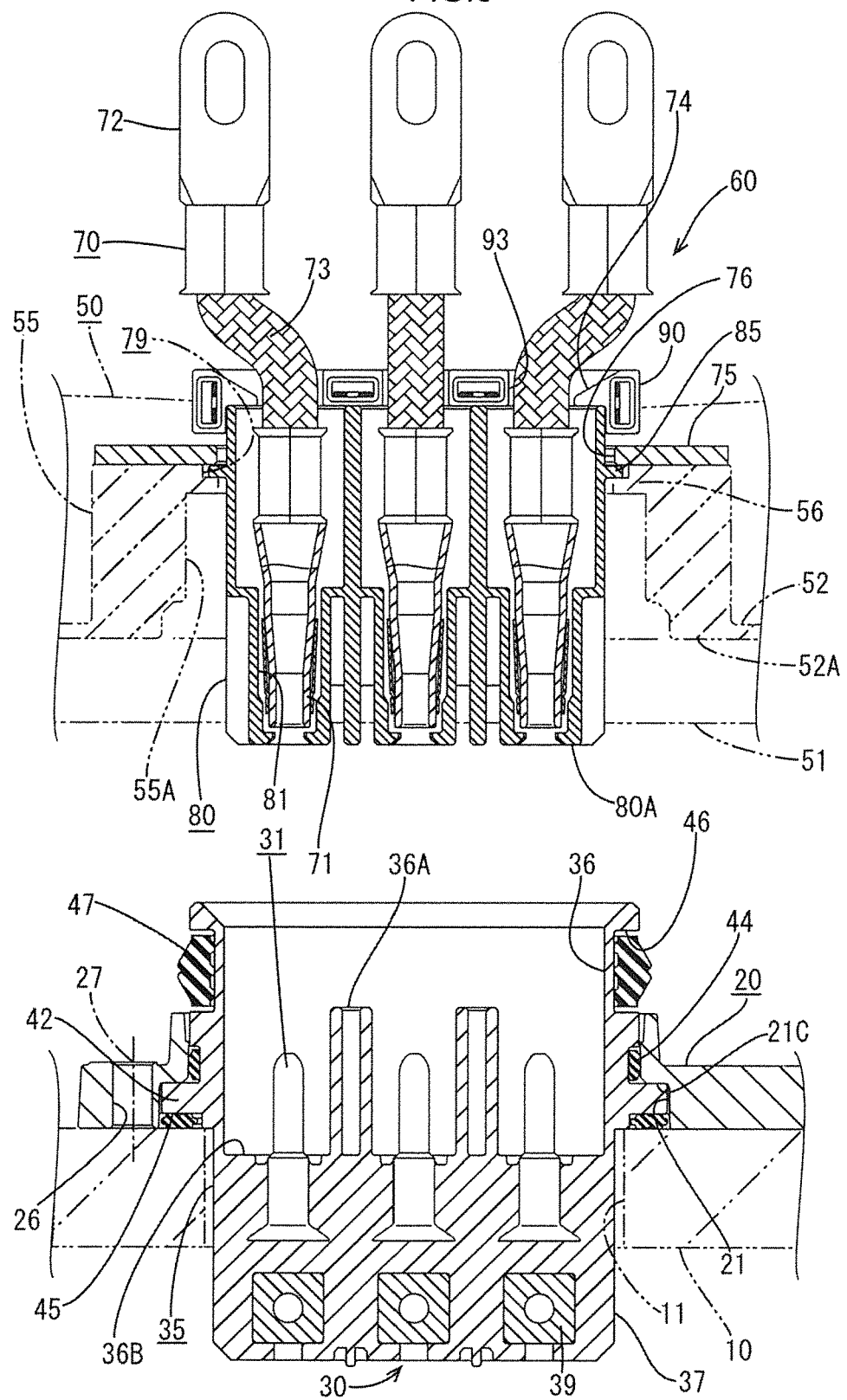
FIG. 6 is a front cross sectional view of the motor-side connector and the inverter-side connector (cross section taken along lines VI-VI of FIG. 3 and FIG. 4).
Figure 7:
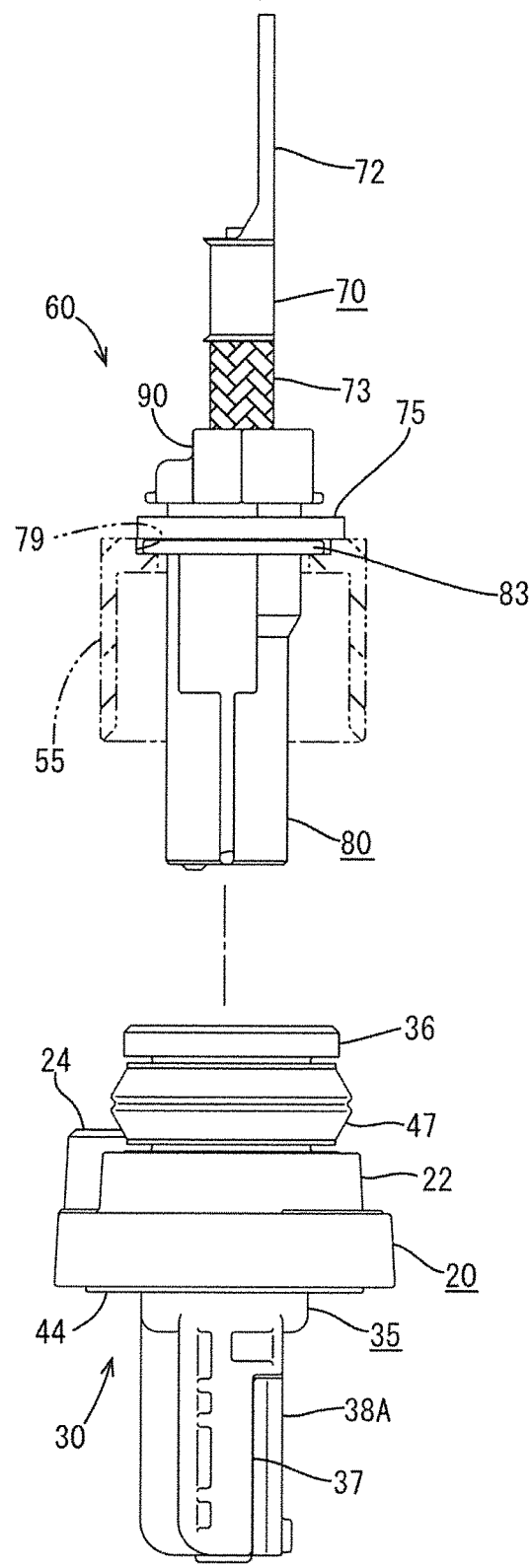
FIG. 7 is a side view of the motor-side connector and the inverter-side connector.

In this embodiment, as illustrated in FIG. 5 and FIG. 6, a motor-side connector 30 is attached to a motor case 10 constituting a motor. To an inverter case 50 constituting an inverter PCU (hereafter simply referred to as the inverter), an inverter-side connector 60 is attached, vertically facing the motor-side connector 30. When the inverter case 50 is placed on and coupled with the motor case 10, the motor-side connectors 30 is fitted with the inverter-side connectors 60. The motor-side connector 30 and the inverter-side connector 60 are both three-pole connectors.

Figure 1:
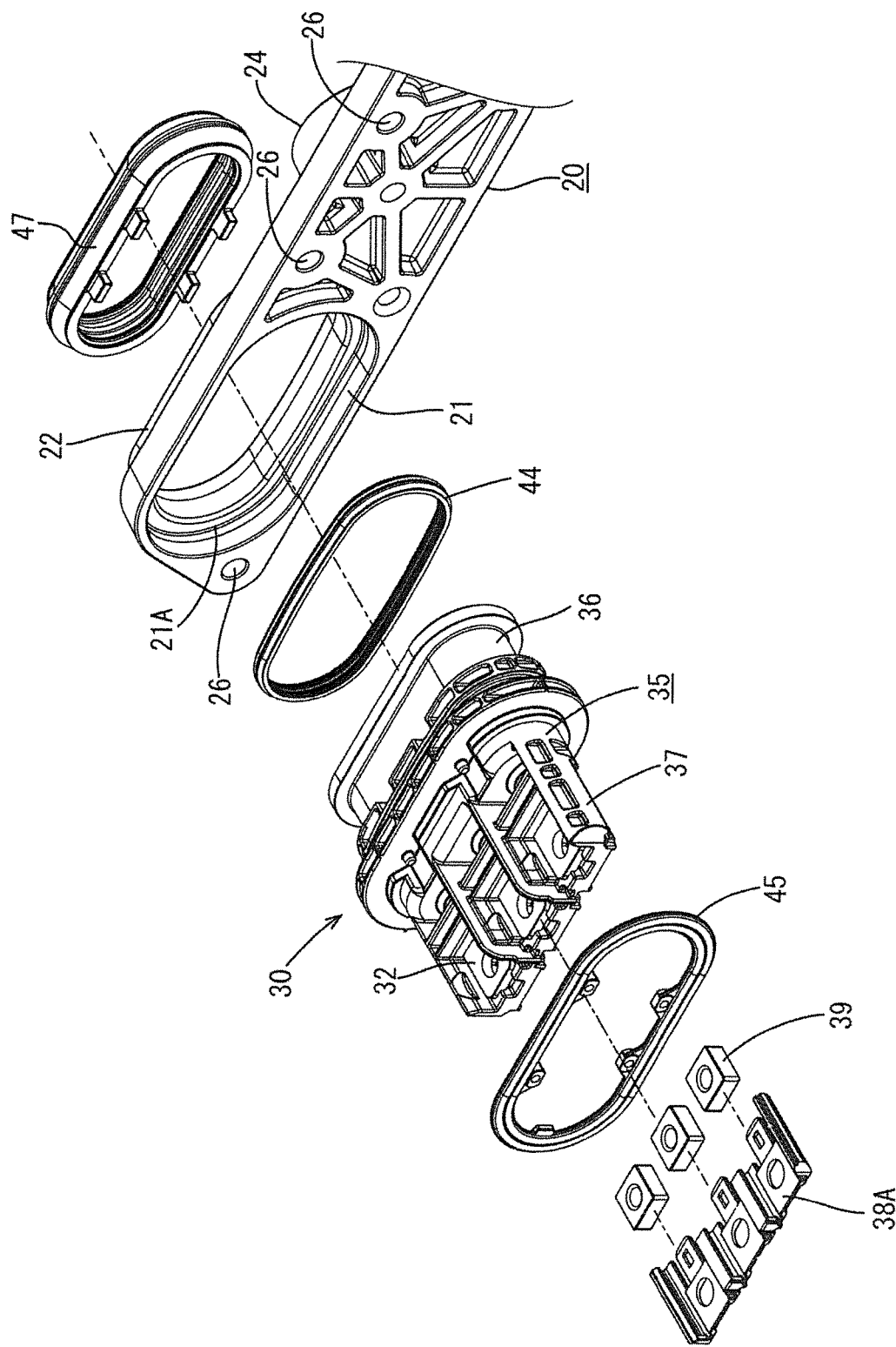
FIG. 1 is an exploded perspective view of a motor-side connector according to an embodiment of the present invention.
Figure 8:
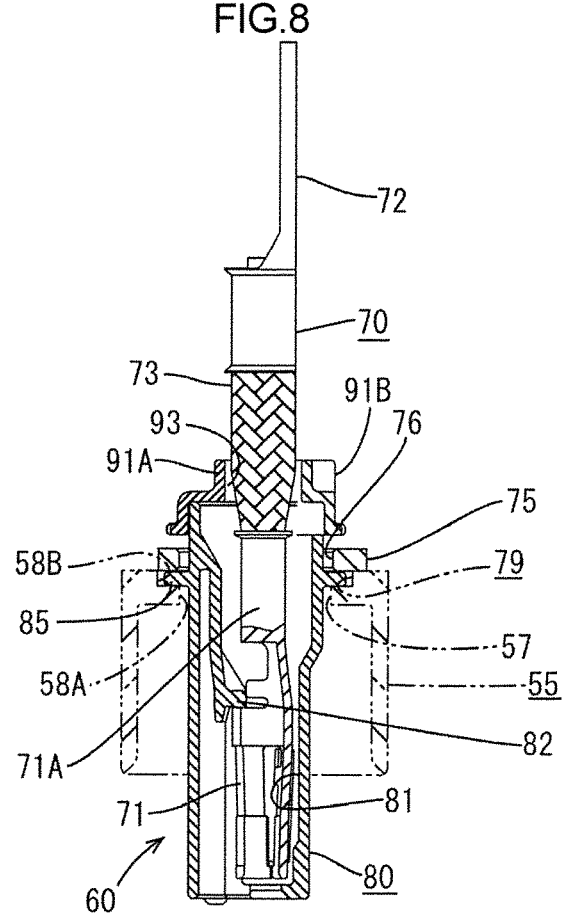
FIG. 8 is a side cross sectional view of the motor-side connector and the inverter-side connector (cross section taken along lines VIII-VIII of FIG. 3 and FIG. 4).
Figure 8:
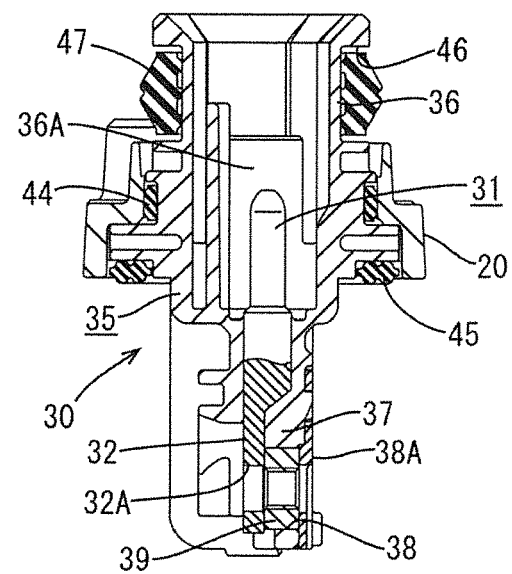
Figure 9:
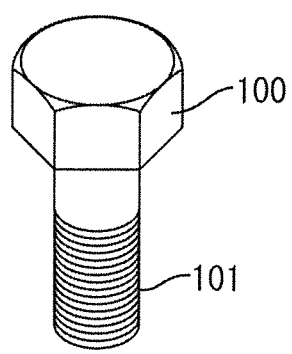
FIG. 9 is a perspective view of a fastening bolt.
Figure 10:
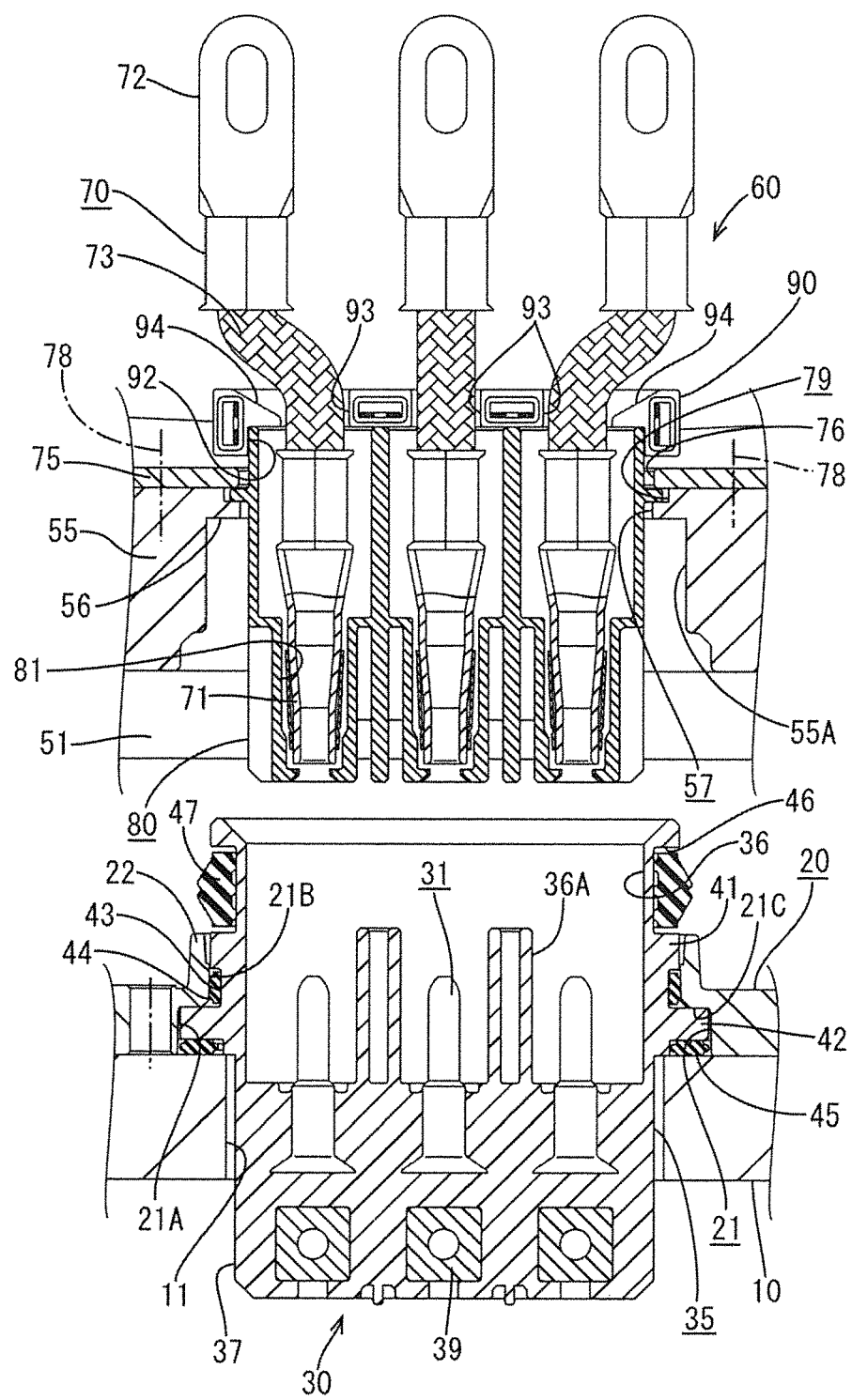
FIG. 10 is a partial cross sectional view illustrating a state immediately before the start of fitting of the motor-side connector with the inverter-side connector in a fitting step.

The motor side will be described. As illustrated in FIG. 1, FIG. 8, and FIG. 10, the motor-side connector 30 is formed with three motor-side terminals 31 embedded in a synthetic resin male housing 35 by insert molding. The motor-side terminals 31 are male terminals including round pins with connecting plate portions 32 formed at the lower end, the connecting plate portions 32 having connecting holes 32A opened therein.

The male housing 35 includes an oval and tubular hood portion 36 having an upper surface opening, and a terminal base 37 continuously provided on a lower surface side of the hood portion 36. In the hood portion 36, two partition walls 36A are formed so as to rise from a bottom surface of the hood portion 36.

In the male housing 35, three motor-side terminals 31 are embedded side by side. The ends of the motor-side terminals 31 respectively protrude into the three regions partitioned by the partition walls 36A in the hood portion 36. The connecting plate portions 32 of the motor-side terminals 31 are disposed side by side while being exposed at the lower end of the terminal base 37.

In the rear sides of the respective connecting plate portions 32 of the terminal base 37, nut accommodating holes 38 are formed. In the respective nut accommodating holes 38, square nuts 39 are non-rotatably accommodated and retained by holders 38A attached to back surfaces thereof.

Figure 3:
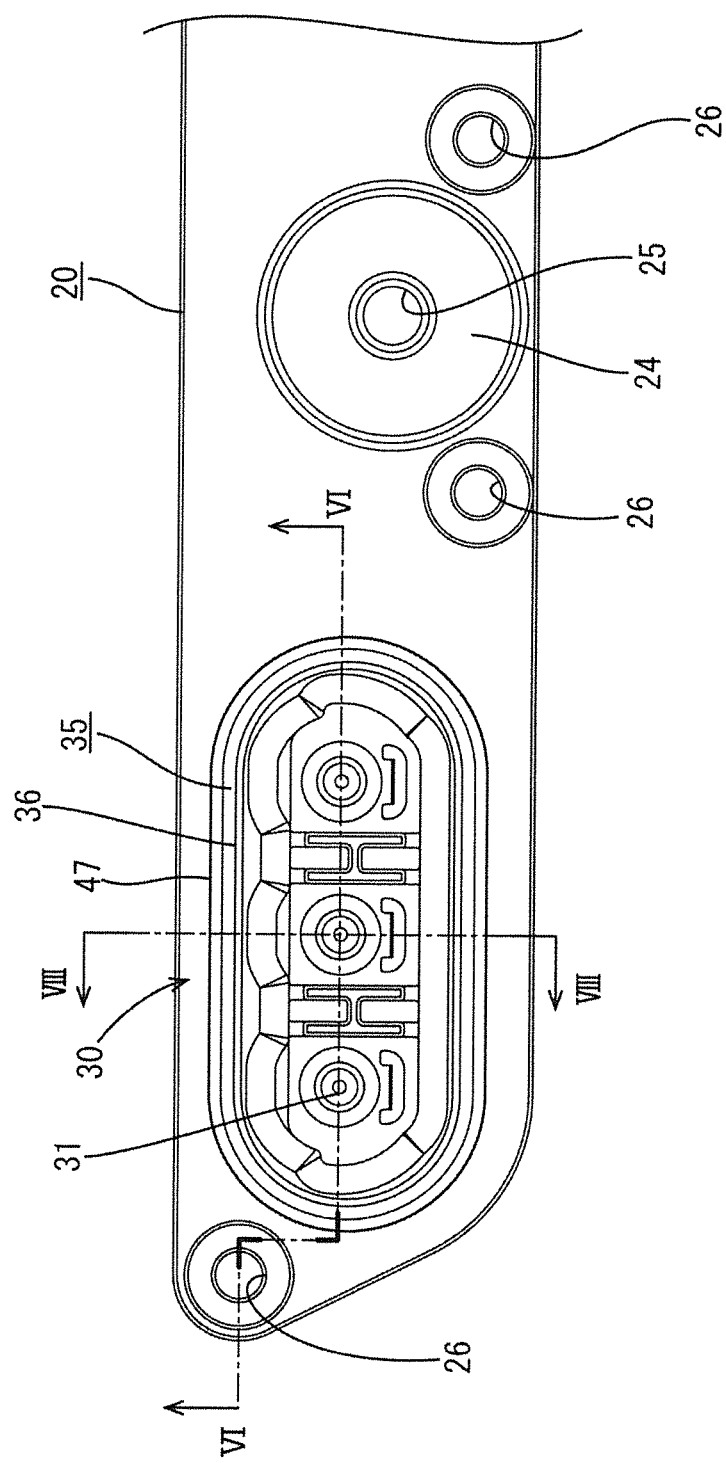
FIG. 3 is a plan view of a motor-side connector attachment structure.

As illustrated in FIG. 3 and FIG. 6, the motor-side connector 30 is adapted to be attached to the motor case 10 while being held in a predetermined position in a shield shell 20.

Accordingly, as illustrated in FIG. 10, on the lower end outer periphery of the hood portion 36 of the male housing 35, a small-diameter upper flange 41 and a large-diameter lower flange 42 are formed at a predetermined interval. In a groove portion 43 configured between an inner periphery side of the lower flange 42 and the upper flange 41, a second axial seal 44 is fitted.

The shield shell 20 is made of die-cast aluminum and, as illustrated in FIG. 1, formed in the shape of a thick strip. The shield shell 20 has a holding hole 21 into which the motor-side connector 30 can be fitted from below.

As illustrated in FIG. 10, the holding hole 21 is a stepped hole including a large-diameter hole 21A on the lower end side to which the lower flange 42 formed on the male housing 35 is substantially closely attached, and a small-diameter hole 21B on the upper end side to which the upper flange 41 is substantially closely attached. On a hole edge on an upper surface of the small-diameter hole 21B, a peripheral wall 22 is formed so as to rise substantially flush with an inner surface of the small-diameter hole 21B. The large-diameter hole 21A has a greater depth (height) than a thickness of the upper flange 41.

The motor-side connector 30 is fitted into the holding hole 21 of the shield shell 20 from below until the lower flange 42 abuts on a step portion 21C of the holding hole 21 when the upper flange 41 enters an upper end portion of the peripheral wall 22, where the upper end portion of the male housing 35 protrudes above the peripheral wall 22. The second axial seal 44 seals a gap between an outer periphery of the male housing 35 and an inner periphery of the holding holes 21.

On a lower surface of the lower flange 42, a surface seal 45 is attached. The surface seal 45 is pressed onto a hole edge of an upper surface of a mounting hole 11, as will be described below, opened in the motor case 10 to seal the mounting hole 11. The male housing 35 has an attachment groove 46 circumferentially provided in an outer periphery of the end portion thereof. In the attachment groove 46, a first axial seal 47 is attached to seal a gap from an inner peripheral surface of a fitting recess portion 55A, as will be described below, opened in the inverter case 50.

As illustrated in FIG. 1 and FIG. 3, a female screw base 24 is formed so as to protrude laterally of the holding hole 21 in the shield shell 20. The female screw base 24 has, at its center, a screw hole 25 into which a fastening bolt 100, as will be described below, attached to the inverter case 50 side is threaded.

The shield shell 20 has bolt insertion holes 26 opened in the end thereof and on both sides of the female screw base 24.

As illustrated in FIG. 6, in upper surface of the motor case 10, a mounting hole 11 is opened concentrically with the holding hole 21. Into the mounting hole 11, the lower side of the male housing 35 downwardly protruding from the respective holding hole 21 in the shield shell 20 is substantially tightly fitted.

The shield shell 20 is adapted to be stacked on the upper surface of the motor case 10 with the lower side of the male housing 35 fitted in the corresponding mounting hole 11, and then fixed in place as bolts 27 are passed through the bolt insertion holes 26 and screwed into screw holes (not illustrated) formed in the motor case 10. The terminal base 37 of the male housing 35 protrudes into the motor case 10.

Accordingly, the motor-side connector 30 is adapted to be fixedly attached via the shield shell 20 while penetrating through the mounting hole 11 opened in the upper surface of the motor case 10.

The inverter side will be described.

Figure 2:
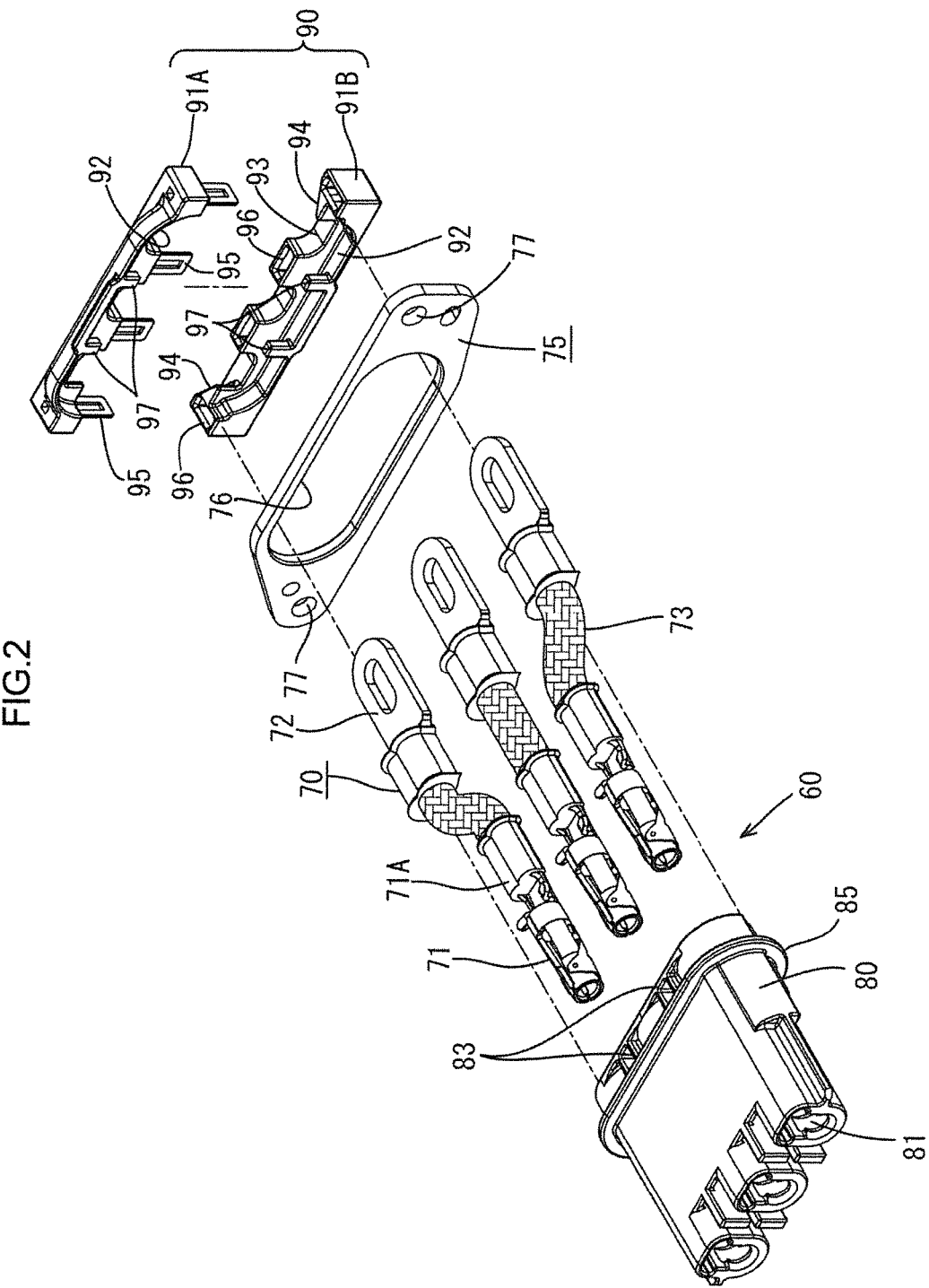
FIG. 2 is an exploded perspective view of an inverter-side connector.

As illustrated in FIG. 2, FIG. 8, and FIG. 10, the inverter-side connector 60 is configured of a synthetic resin female housing 80, three inverter-side terminals 70 attached in the female housing 80, and a back retainer 90 for retaining the inverter-side terminals 70. The inverter-side terminals 70 have a structure in which female terminals 71 connected to the above-described motor-side terminals 31 and BA terminals 72 connected to the inverter output terminals (not illustrated) are joined via braided wires 73.

The female housing 80 is formed in a block shape with an oval outline enabling the female housing 80 to fit into the male housing 35 of the motor-side connectors 30. In the female housing 80, three cavities 81 for accommodating the female terminals 71 of the inverter-side terminals 70 are formed side by side.

The back retainer 90 is also made of synthetic resin and, as illustrated in FIG. 2, formed by assembling a pair of divided retainers 91A, 91B. The integrally assembled back retainer 90 is formed in an elongated-square, thick plate shape generally covering the upper surface opening of the male housing 35.

In the lower surface of the integrated back retainer 90, as illustrated in FIG. 10, an oval fitting recess portion 92 having a predetermined depth is formed for closely fitting the upper end portion of the female housing 80. In a roof surface of the fitting recess portion 92, three insertion holes 93 are formed at the same pitch as that of the cavities 81 so as to allow insertion of the ends of the braided wires 73 that are connected to the female terminals 71. Of the three insertion holes 93, the insertion holes 93 at both right and left ends have tapered surfaces 94 where the respective surfaces on the outside in the direction in which the insertion holes are arranged (the left-side surface of the left-end insertion hole 93, and the right-side surface of the right-end insertion hole 93) are upwardly diagonally opened.

As illustrated in FIG. 2, on the divided retainer 91A that is one of the divided retainers 91A, 91B, a total of four locking pieces 95 are formed protruding at both ends of the divided retainer 91A in the longitudinal direction and between the insertion holes 93. On the other divided retainer 91B, four lock receiver portions 96 are formed at corresponding positions to receive and retain the respective locking pieces 95.

From a linear wall surface of the fitting recess portion 92 of each of the divided retainers 91A, 91B, a pair of attachment protrusions 97 is formed in a protruding manner. In each of linear front and rear surfaces at the upper end of the female housing 80, a pair of attachment recess portions 83 is bored for the fitting of the attachment protrusions 97.

When the inverter-side connector 60 is assembled, the female terminals 71 of the inverter-side terminals 70 are inserted into the corresponding cavities 81 of the female housing 80 from above, and primarily locked by lances 82 provided in the cavities 81 (see FIG. 8). Then, the pair of divided retainers 91A, 91B is disposed so as to sandwich the upper end portion of the female housing 80 from the front and rear, and the attachment protrusions 97 are fitted in the attachment recess portions 83. The locking pieces 95 are inserted into the lock receiver portions 96 until the opposing edges are abutted on each other. When the opposing edges are normally abutted on each other, the locking pieces 95 are elastically locked in the lock receiver portions 96, whereby the back retainer 90 is integrally assembled. The back retainer 90 is attached with the upper end portion of the female housing 80 being fitted in the fitting recess portion 92. When the back retainer 90 is attached, barrels 71A at the upper ends of the female terminals 71 are locked in hole edges on the lower side of the insertion holes 93 and thus doubly retained.

The braided wires 73 connected to the barrels 71A of the female terminals 71 are pulled up via the insertion holes 93 of the back retainer 90. In the present embodiment, as illustrated in FIG. 5 and FIG. 6, with respect to the three inverter-side terminals 70, the BA terminals 72 are disposed at a greater pitch than that of the female terminals 71. Accordingly, for the two inverter-side terminals 70 at both right and left ends, the respective braided wires 73 need to be bent toward right or left upon exiting the insertion holes 93 of the back retainer 90. Since the insertion holes 93 at the both ends of the back retainer 90 have the tapered surfaces 94, the braided wires 73 can be bent as described above without interference with the inner surfaces of the insertion holes 93.

While the above-described motor-side connector 30 is fixedly attached to the motor case 10, the inverter-side connector 60 is attached to the inverter case 50 in a floating state.

As schematically illustrated in FIG. 5, the inverter case 50 has a body case 51 on a front surface side of which a connector attachment case 52 for attachment of the inverter-side connector 60 (hereafter "attachment case 52") is formed extending with a bottom raised by a predetermined size. Accordingly, the inverter-side connector 60 is attached to the attachment case 52 in a floating state.

The attachment structure for the inverter-side connector 60 will be described with reference to FIG. 6 and FIG. 8. The female housing 80 of the inverter-side connector 60 has a flange 85 at a position closer to the upper end, the flange 85 extending along the entire circumference.

On a bottom surface 52A of the attachment case 52, a mount base 55 with an open lower surface is formed upright. The mount base 55 has a substantially parallelogrammatic planar shape. The interior of the mount base 55 provides the fitting recess portion 55A into which the upper end portion of the male housing 35 of the motor-side connector 30 is fitted.

In a roof wall 56 of the mount base 55, a support hole 57 is opened for supporting the female housing 80 passed therethrough from above. The support holes 57 are disposed at the same interval as the interval of the holding holes 21 opened in the shield shell 20 on the motor side. As illustrated in FIG. 8, the support hole 57 is a stepped hole including a small-diameter hole 58A on the lower side into which the outer periphery of the female housing 80 can be inserted with a clearance, and a large-diameter hole 58B in the upper side into which the flange 85 of the female housing 80 can be inserted with a clearance. The large-diameter hole 58B on the upper side has a depth which is slightly smaller than the thickness of the flange 85.

The right and left side walls of the mount base 55 are thickly formed.

Figure 4:
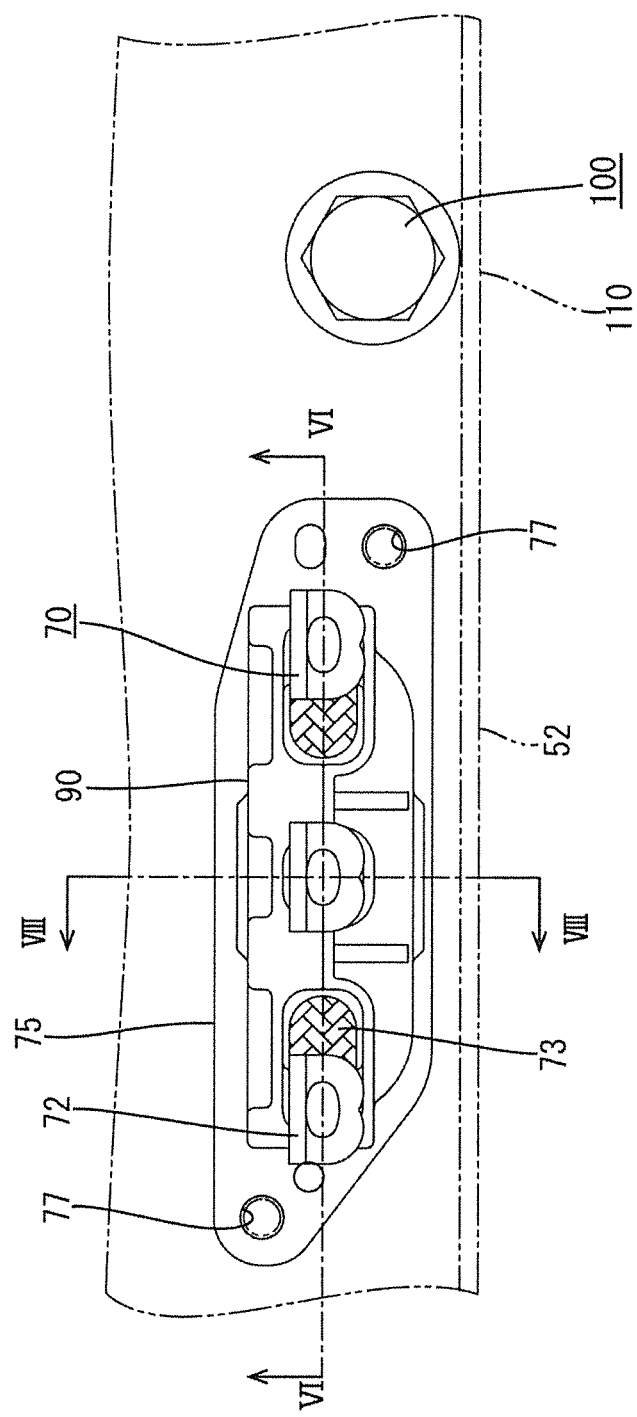
FIG. 4 is a plan view of an inverter-side connector attachment structure.

The mount base 55 is adapted to be covered with a metal plate bracket 75. The bracket 75 has a planar shape substantially identical to the upper surface of the mount base 55. As illustrated in FIG. 6, the bracket 75 has a lock hole 76 into which the outer periphery of the female housing 80 can be inserted with a clearance. As illustrated in FIG. 4, the bracket 75 has screw insertion holes 77 at both ends. By passing screws 78 (see FIG. 10) through the screw insertion holes 77 and threadedly engaging the screws with screw holes (not illustrated) formed in right and left side walls of the mount base 55, the bracket 75 is fixed in place on the upper surface of the mount base 55 with the lock hole 76 disposed concentrically with the support hole 57.

In a procedure for attaching the female housing 80, the female housing 80 is inserted into the support hole 57 of the mount base 55 from above, and the flange 85 is received and supported on the hole edge of the small-diameter hole 58A of the support hole 57. Then, the bracket 75 is placed over the upper surface of the mount base 55 while allowing for insertion of the upper end portion of the female housing 80 into the lock hole 76, and fixed by being fastened by the screws 78. The flange 85 is locked on the hole edge of the lock hole 76, thus preventing the female housing 80 from being pulled upward.

Thus, the female housing 80, with the upper end portion thereof penetrating through the support hole 57 of the mount base 55 and the lock hole 76 of the bracket 75, is supported in such a way as to be radially freely movable by as much as the clearance mainly between the flange 85 and the large-diameter hole 58B. In this way, the female housing 80 is attached in a floating state with respect to the attachment case 52. Accordingly, the support hole 57 in the mount base 55 of the attachment case 52, and the lock hole 76 in the bracket 75 fixed on the mount base 55 constitute a mounting hole 79 which supports the inverter-side connector 60 penetrating therethrough in a radially freely movable manner.

In the present embodiment, as partly described above, the motor-side connector 30 and the inverter-side connector 60 are fitted to each other when the inverter case 50 is mounted on and coupled with the motor case 10. The cases 10, 50 are adapted to be fastened to each other using the fastening bolt 100 (see FIG. 9) and auxiliary bolts (not illustrated) so as to normally fit the connectors 30, 60 together. The relevant structures are described below.

As illustrated in FIG. 4, laterally of the mount base 55 on the bottom surface of the attachment case 52 of the inverter case 50, a pedestal 110 for supporting the fastening bolt 100 in a hanging and axially rotatable manner is formed. The pedestal 110 has an open lower surface and is formed upright so as to extend to a position substantially corresponding to the central height of the mount base 55. The lower end of the male screw portion 101 of the fastening bolt 100, supported on the pedestal 110 in a hanging manner, protrudes beyond the bottom surface 52A of the attachment case 52 by a predetermined size so as to be threaded into the screw hole 25 in the female screw base 24 on the shield shell 20 fixed on the upper surface of the motor case 10.

The auxiliary bolts are also adapted to be able to fasten the bottom surface of the body case 51 of the inverter case 50 and the upper surface of the motor case 10 to each other at a plurality of locations.

In order to allow the inverter case 50 to be mounted in a predetermined position on the motor case 10, a positioning mechanism, not illustrated, is provided. The positioning mechanism is set such that, when the inverter case 50 is normally positioned and opposed to the motor case 10, the inverter-side connector 60 and the motor-side connector 30 are coaxially opposed to each other, and the fastening bolt 100 and the screw hole 25 in the female screw base 24 are coaxially opposed to each other.

The operation of the present embodiment with the above-described structure will be described.

As illustrated in FIG. 6, on the motor side, the motor-side connector 30 is held by being water-tightly fitted in the holding hole 21 in the shield shell 20 via the second axial seal 44. The shield shell 20 is fixed on the motor case 10 using screws, with the lower end portion of the male housing 35 being fitted in the mounting hole 11 in the upper surface of the motor case 10. In this way, the motor-side connector 30 is fixedly attached on the upper surface of the motor case 10, and the hole edge on the upper side of the mounting hole 11 is sealed by the surface seal 45.

On the other hand, on the inverter side, the inverter-side connector 60 is supported while penetrating through the mounting hole 79 extending between the roof wall 56 of the mount base 55 formed on the attachment case 52 of the inverter case 50 and the bracket 75, in a radially freelymovable manner. That is, the inverter-side connector is attached in a floating state. With respect to the three inverter-side terminals 70, the braided wires 73 of the inverter-side terminals 70 on the right and left sides are bent outward, allowing the pitch of the BA terminals 72 to be increased.

Also, the fastening bolt 100 is hung and supported rotatably with respect to the pedestal 110.

The inverter-side connector 60 is fitted to the corresponding motor-side connector 30 as follows.

From the state illustrated in FIG. 6, the inverter case 50 is lowered onto the motor case 10 while being positioned by the positioning mechanism. As illustrated in FIG. 10, the inverter-side connector 60 begins to be fitted to the motor-side connector 30. Even if the inverter-side connector 60 and the motor-side connector 30 are misaligned, the inverter-side connector 60, being supported in a floating state, can freely move radially and be aligned, whereby the connectors 30, 60 are normally and smoothly fitted to each other.

Figure 11:
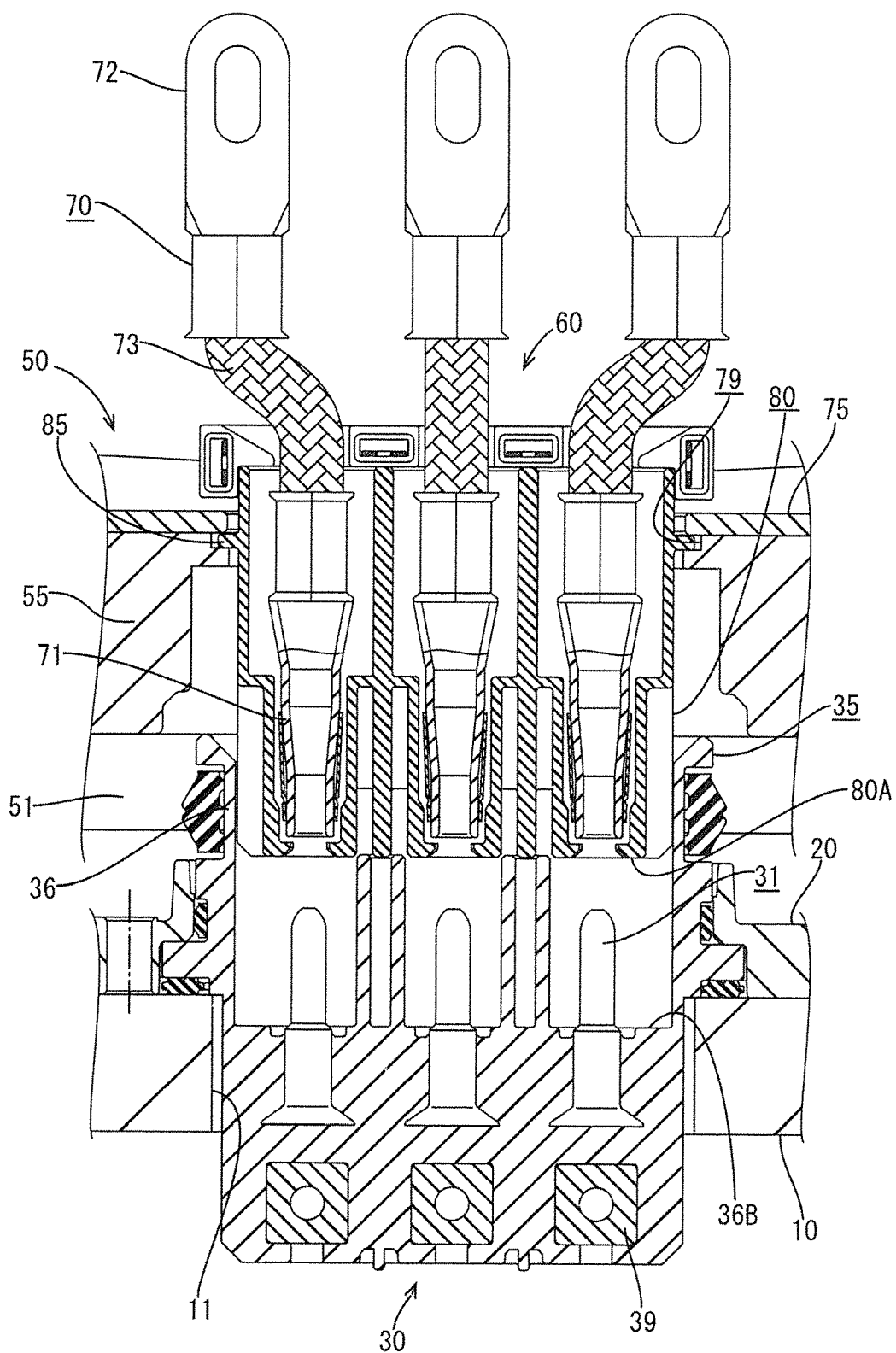
FIG. 11 is a partial cross sectional view illustrating an initial state of fitting.

As illustrated in FIG. 11, when the inverter-side connector 60 has been fitted to the opposing motor-side connector 30 by a predetermined amount, the end of the male screw portion 101 of the fastening bolt 100 faces the entry of the screw hole 25 cut in the female screw base 24 of the shield shell 20.

Figure 12:
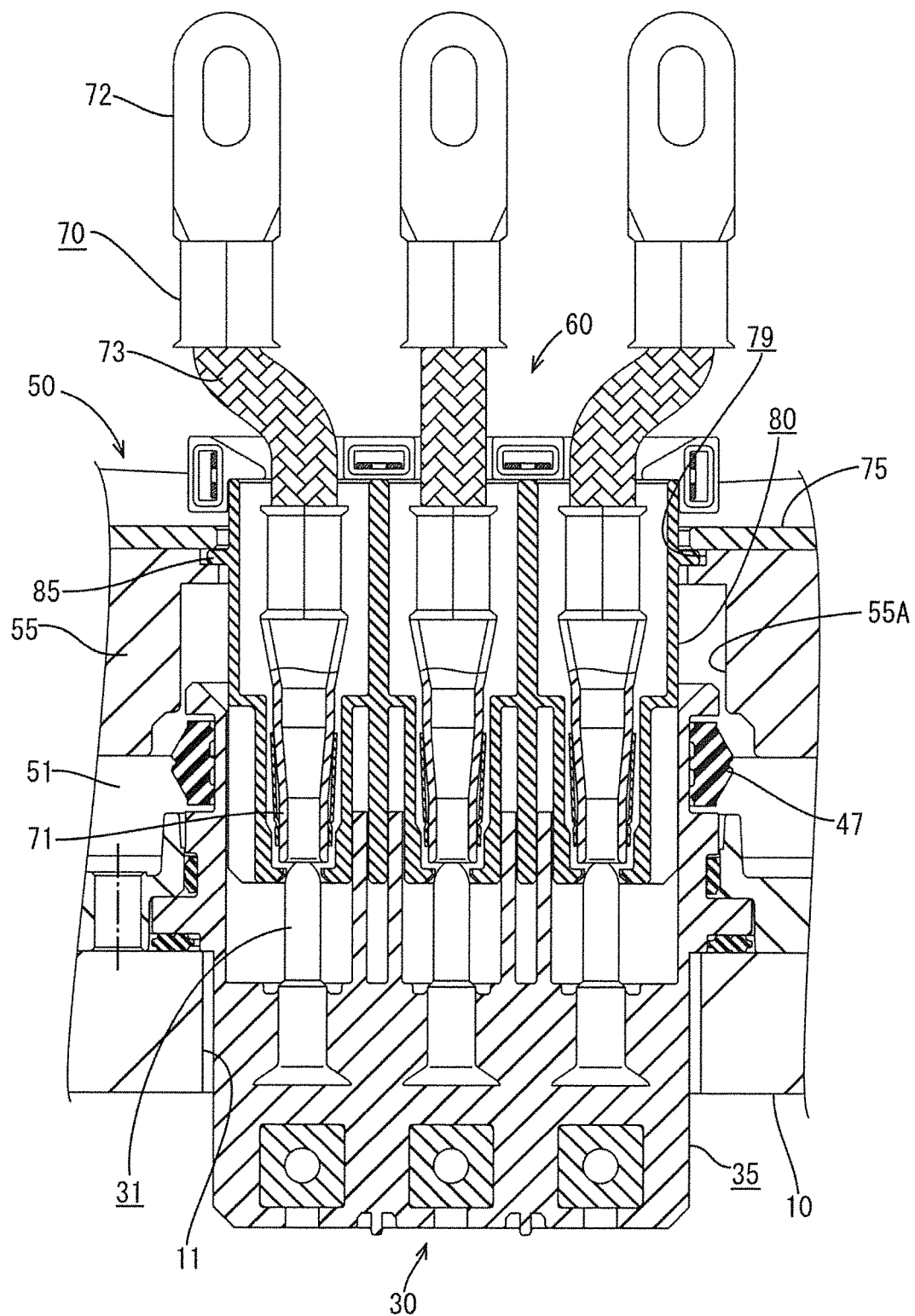
FIG. 12 is a partial cross sectional view illustrating a middle state of fitting.

Then, using a tool such as a torque wrench, the male screw portion 101 of the fastening bolt 100 is screwed into the screw hole 25. In this case, as illustrated in FIG. 12, the inverter case 50 including the attachment case 52 is pulled toward the upper surface of the motor case 10 by an associated boosting function, and the inverter-side connector 60 is gradually fitted to the motor-side connector 30.

When the fastening bolt 100 is further screwed, the inverter-side connector 60 is further fitted to the motor-side connector 30 with the first axial seal 47 fitted on the outer periphery of the upper end portion of the male housing 35 of the motor-side connector 30 being elastically compressed and fitted in the fitting recess portion 55A of the mount base 55. As a result, the female terminals 71 of the inverter-side terminals 70 and the motor-side terminals 31 are gradually fitted and connected to each other.

Figure 13:
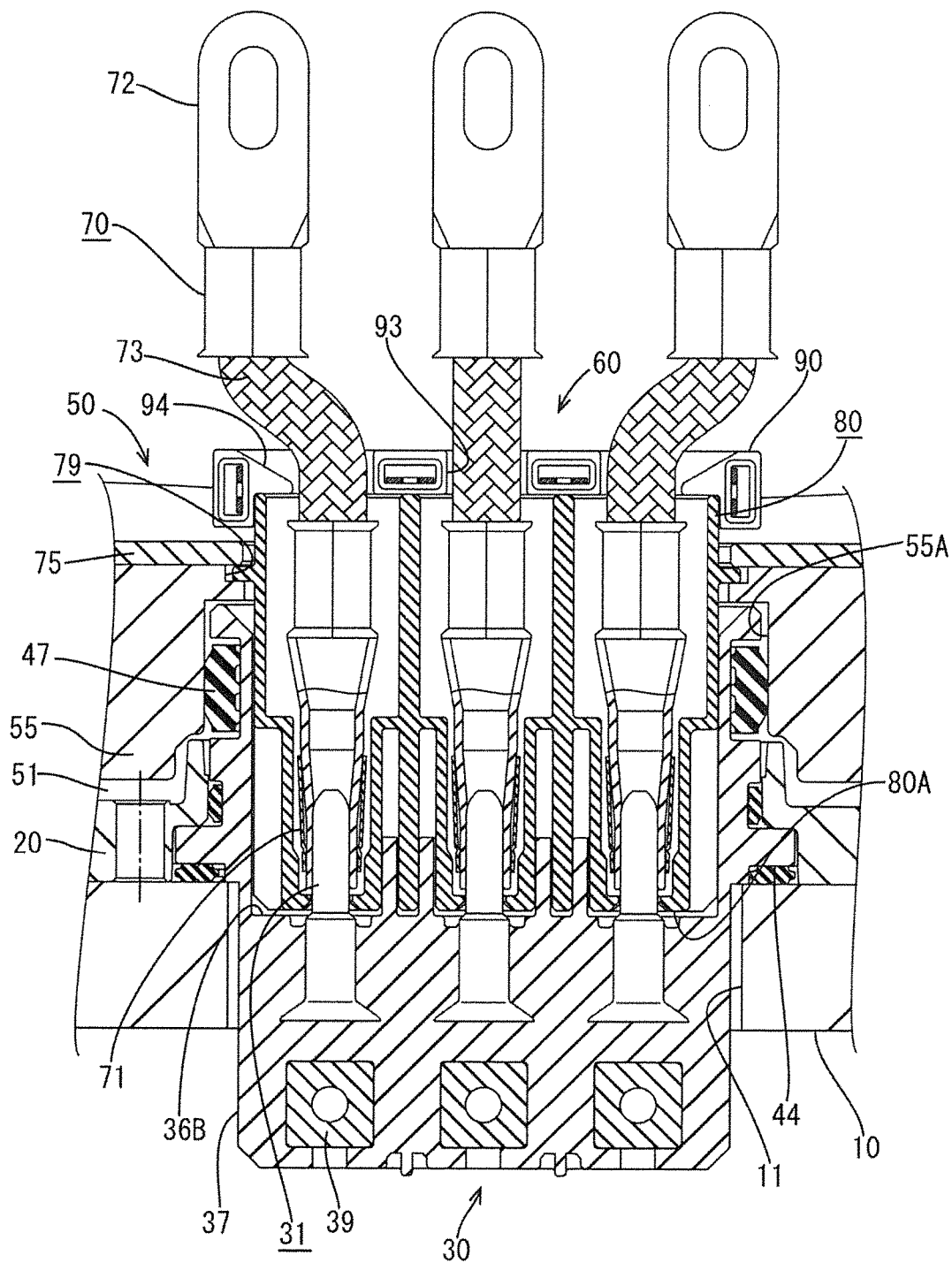
FIG. 13 is a partial cross sectional view illustrating a completed state of fitting.

As illustrated in FIG. 13, the fastening bolt 100 is fastened until the body case 51 of the inverter case 50 abuts on the upper surface of the motor case 10. Thereafter, the body case 51 is fixed in the state of being abutted on the upper surface of the motor case 10 using auxiliary bolts.

In this way, the inverter-side connector 60 and the motor-side connector 30 are placed in a state of being normally fitted to each other. The state of the first axial seal 47, fitted on the male housing 35 of the motor-side connector 30, and closely attached to and sealing the inner periphery of the fitting recess portion 55A of the mount base 55 is also maintained.

In this way, the inverter case 50 is mounted on and coupled with the motor case 10, whereby the operation for fitting the motor-side connector 30 with the inverter-side connector 60 is completed.

In the motor case 10, on the terminal base 37 of the motor-side connector 30, the input terminals of a motor are engaged on the connecting plate portions 32 of the motor-side terminals 31 and connected using bolts. On the other hand, in the inverter case 50, the BA terminals 72 of the inverter-side terminals 70 are connected to the output terminals of an inverter by screwing using terminal bases, which are not illustrated.

As described above, according to the present embodiment, the inverter-side connector 60 is mounted to the inverter case 50 (attachment case 52) in a floating state. Accordingly, when the inverter case 50 is stacked on the motor case 10, even if the inverter-side connector 60 and the motor-side connector 30 are misaligned, the inverter-side connector 60 can freely move radially, allowing the connectors 30, 60 to be aligned, whereby the connectors 30, 60 can be normally fitted to each other. In addition, because the inverter-side connector 60 is provided in a floating state, transmission of vibrations of one of the motor and the inverter to the other via the connectors 30, 60 is interrupted and thus avoided.

Of the connectors 30, 60, the inverter-side connector 60 is provided in a floating state for the following reason. In some specifications of motors, the motor case 10 is filled with oil. In such cases, it is necessary to seal the mounting hole 11, through which the motor-side connector 30 is attached, with a seal ring. In this case, if the motor-side connector 30 is to be provided in a floating state, the seal ring may be deformed in an irregular manner when the motor-side connector 30 freely moves, possibly causing trouble to the seal.

In contrast, according to the present embodiment, the inverter-side connector 60 is provided in a floating state while the motor-side connector 30 is fixedly provided. Accordingly, the mounting hole 11 can be sealed reliably without causing irregular deformation of the surface seal 45.

The mounting hole 11 for supporting the inverter-side connector 60 in a floating state is formed by: the stepped support hole 57 formed in the roof wall 56 of the mount base 55 of the inverter case 50 (attachment case 52), the support hole 57 receiving the flange 85 circumferentially provided on the outer peripheral surface of the inverter-side connector 60 (female housing 80) in a radially freely movable manner; and the bracket 75, which has the lock hole 76 opened so as to be lockable on the peripheral edge of the flange 85, fixed on the mount base 55. Accordingly, the floating function for the inverter-side connector 60 can be implemented by a relatively simple structure.

The inverter-side terminals 70 have the structure in which the female terminals 71 accommodated in the female housing 80 for connection with the counterpart motor-side terminals 31, and the BA terminals 72 for connection with the inverter output terminals are connected via the braided wires 73.

Accordingly, the vibrations on one of the motor side and the inverter side are absorbed by the braided wires 73, so that the transmission of the vibrations to the other via the connected terminals 31, 70 can be avoided.

In a case where there is a deviation between the attachment position of the inverter-side connector 60 and the position of the terminal base in which the BA terminals 72 of the inverter-side terminals 70 are disposed, the positional displacement can be absorbed when the braided wires 73 expand or contract.

The present invention is not limited to the embodiment explained in the above description and described with reference to the drawings, and may include the following exemplary embodiments in the technical scope of the present invention:

The structure for supporting the inverter-side connector in a floating state is not limited to the structure illustrated with reference to the embodiment, and other structures may be adopted.

According to the embodiment, the braided wires have been described as an example of the flexible conductive member provided in the inverter-side terminals. However, other members, such as exposed stranded wires, may be adopted.

The inverter-side terminals may be formed with any structure as long as they are provided with a first connecting portion for connection with the counterpart motor-side terminals, a second connecting portion for connection with the inverter output portion, and a flexible conductive member.

EXPLANATION OF SYMBOLS

10: Motor case
11: Mounting hole
20: Shield shell
30: Motor-side connector
31: Motor-side terminal
35: Male housing
50: Inverter case
52: Attachment case
55: Mount base
57: Support hole (stepped hole)
60: Inverter-side connector
70: Inverter-side terminal
71: Female terminal (first connecting portion)
72: BA terminal (second connecting portion)
73: Braided wire (flexible conductive member)
75: Bracket (lock plate)
76: Lock hole
79: Mounting hole
80: Female housing
85: Flange

The invention claimed is:

1. A connector device comprising:
a motor case including a mounting hole;
a motor-side connector mounted in the mounting hole of the motor case and fixed to the motor case, the motor-side connector including a motor-side terminal;
an inverter case including a roof wall having opposite first and second surfaces and a support hole penetrating through the roof wall, the support hole including a small cross-section part adjacent the first surface and a large cross-section part adjacent the second surface, the large cross-section part having a specified depth from the second surface;
an inverter-side connector having an inverter-side terminal and a flange circumferentially provided on an outer surface of the inverter-side connector, the inverter side connector being mounted in the support hole of the inverter case with the flange mounted in the large cross-section part of the support hole; and
a bracket mounted to the second surface of the roof wall of the inverter case, the bracket having a lock hole surrounding a part of the inverter-side connector projecting from the second surface of the roof wall,
wherein:
the inverter case is configured to be coupled with the motor case so that the motor-side connector and the inverter-side connector are fit to each other,
the flange has a uniform thickness substantially equal to the depth of the large cross-section part of the support hole in the inverter case,
the lock hole of the bracket is smaller than an outer diameter of the flange of the inverter-side connector and larger than an outer cross-section of the part of the inverter-side connector surrounded by the lock hole, and
the flange is cross-sectionally larger than the small cross-section part of the support hole and smaller than the large cross-section part of the support hole so that the inverter-side connector is freely radially movable in the large cross-section part of the support hole without being separable from the support hole.

2. The connector device according to claim 1, wherein the motor-side terminal and the inverter-side terminal are connectable to each other via a flexible conductive member.

3. The connector device according to claim 2, wherein the inverter-side terminal includes a first connection portion connected to the motor-side terminal, and a second connection portion connected to an output of the inverter, the first connection portion and the second connection portion being connected by the flexible conductive member.

4. The connector device according to claim 1, wherein the flange is integrally formed with the outer surface of the inverter-side connector to protrude from the outer surface of the inverter-side connector.

* * * * *